United States Patent [19]

Obrist

[11] 4,272,945
[45] Jun. 16, 1981

[54] PROCESS AND APPARATUS FOR THE PRODUCTION OF A GUARANTEE CLOSURE

[76] Inventor: Albert Obrist, Alte Therwilerstrasse 12, 4153 Reinach, Switzerland

[21] Appl. No.: 39,967

[22] Filed: May 17, 1979

[30] Foreign Application Priority Data

May 17, 1978 [CH] Switzerland .................. 5316/78

[51] Int. Cl.³ ................. B65B 7/28; B65B 53/06
[52] U.S. Cl. ........................... 53/557; 53/329; 156/86
[58] Field of Search ............. 53/419, 442, 478, 139.3, 53/557, 367, 381 A, 329; 198/394, 416, 657; 156/86, 497, 69; 239/521, 523

[56] References Cited

U.S. PATENT DOCUMENTS

| | | | |
|---|---|---|---|
| 2,471,332 | 5/1949 | Lemmel | 53/381 A |
| 3,142,371 | 7/1964 | Rice | 198/394 |
| 3,237,871 | 3/1966 | Vicard | 239/523 |
| 3,523,402 | 8/1970 | West et al. | 53/557 |
| 3,539,393 | 10/1970 | Bickham | 53/557 X |
| 3,611,662 | 10/1971 | Schmitt | 53/367 X |
| 3,659,394 | 5/1972 | Hartleib | 53/442 |
| 3,717,184 | 2/1973 | Bischof et al. | 198/657 |
| 3,873,018 | 3/1975 | Donnay | 53/139.3 |
| 3,945,623 | 3/1976 | Gaudilliere | 239/523 |
| 4,018,640 | 4/1977 | Amberg | 156/86 |

FOREIGN PATENT DOCUMENTS 1779252 9/1971 Fed. Rep. of Germany .

Primary Examiner—John Sipos
Attorney, Agent, or Firm—Larson, Taylor and Hinds

[57] ABSTRACT

Containers such as drink bottles are provided with closure caps having plastics guarantee strips shrink fitted on to the containers which can be torn off when the container is first opened. The present invention provides a process for the production of such closures in which guarantee strips are simultaneously and continuously shrink fitted on a plurality of containers by passing the containers provided with the closure caps through transport means wherein they are both moved forwardly and also rotated about their own axis. A slot-like nozzle arranged in the plane of movement of the guarantee strips and extending over the entire forward feed distance directs a jet of hot gas on to the guarantee strips. A transport screw is particularly suitable for producing the forward movement of the containers in the transport means, while the containers are pressed against a wall on which they roll and which has a high coefficient of friction. Rotation of the screw, moves the containers forwardly in the transport means, simultaneously rotates them about their own axis rolling them against the wall. A plurality of containers can be passed simultaneously along the length of the slot-like nozzle, depending on the length of the transport means.

6 Claims, 3 Drawing Figures

PROCESS AND APPARATUS FOR THE PRODUCTION OF A GUARANTEE CLOSURE

FIELD OF THE INVENTION

This invention is concerned with the simultaneous and continuous production of guarantee closures on a plurality of containers.

BACKGROUND OF THE INVENTION

Closure caps are known having a guarantee strip which can be separated along a desired tear line and which is of plastics material. The guarantee strip can be shrink fitted onto the neck of the container by heat deformation and can be torn off along the tear line when the closure is opened for the first time.

Guarantee closures of this kind are used in particular on bottles for refreshment drinks. The process for producing the guarantee closure is part of the entire bottling process wherein the bottle is generally passed automatically through a number of different pieces of equipment, such as bottling apparatus, closure apparatus, labelling apparatus and the like.

PRIOR ART

Various processes have already been proposed for use in fully automatic equipment. For example German patent specification No. 17 79 252, 9/9/71, to Leitz discloses a process for the production of a guarantee closure, wherein the container with the closure cap fitted thereon is rotated about its own axis. During this rotary movement, a hot gas jet is directed on to the guarantee strip to be deformed. At the same time, pressure rollers press the guarantee strip against the mouth of the container and simultaneously act as sensing means to interrupt the application of heat to the guarantee strip when it has been fully shrink fitted onto the container. This process suffers from the disadvantage that only a single guarantee strip can be shrink fitted at a time in the apparatus. In addition, the process is intermittent and for this reason is slow. However, in modern bottling equipment, the feed speed of the bottling section is extremely high, so that the process disclosed in German patent specification No. 17 79 252 is ruled out from the outset.

Processes have also been proposed, wherein heated pressure jaws are aplied around the guarantee strip and shrink the strip onto the mouth of the container. As however these processes only permit a cyclic feed movement for the bottles, they also are not suitable for modern bottling lines.

SUMMARY OF THE INVENTION

The present invention is directed to the elimination of the disadvantages of the prior art and provides a process for the production of a guarantee closure, which operates at high speed and by which a plurality of guarantee strips can be shrink fitted simultaneously, without thereby reducing the bottling speed of the entire equipment.

According to the present invention the mouths of the containers are first closed in per se known manner by respective closure caps, the containers are then fed in a vertical position sequentially to a transport means which moves the containers forwardly over a predetermined distance, during this feed movement, the containers are simultaneously and continuously rotated at least once about their own axis and, during this feed movement and continuous rotation in the transport means, a hot air jet directed at approximately right angles to the axis of the containers, impinges on the containers from at least one side, whereby the guarantee strips are continuously shrunk onto the container in the course of the rotary and feed movements.

An advantage of this process lies in the continuous mode of operation and in the capability for processing a plurality of containers simultaneously. The containers are rotated about their own axis without any interruption in the actual feed movement of the containers in the apparatus. This permits an extremely rational mode of operation and high bottling speeds can be achieved.

The process according to the invention may be carried out in a particularly advantageous manner in apparatus in which the containers standing on a conveyor belt, are conveyed, by a transport screw of which the screw pitch is adapted to the outside diameter of the bottle, along a wall disposed opposite the screw, the containers rolling as they move along the wall. In this way, the desired rotation of the container, while it is being simultaneously moved forwardly, may be achieved without expensive means.

In a preferred form of the process according to the invention, the containers are rotated by the transport means at least twice completely around their own axis in the region in which the hot air nozzles impinge on the containers. This arrangement makes it possible for a fresh container to be fed to the transport means as soon as the preceding container has carried out a full revolution. In addition, multiple rotation of the containers in the transport means permits a higher feed speed as the guarantee strips are exposed to the hot air jet issuing from the correspondingly elongated slot-like nozzle, over a longer distance.

In order to reduce frictional losses in the transport means, the conveyor belt on which the containers are fed to the transport means and the screw on which the containers are moved forwardly and rolled, operate in synchronism. In this way the conveyor speed of the screw is precisely adapted to the speed of the conveyor belt. In accordance with a further embodiment of the invention, the feed speed of the containers in the transport means is continuously adjustable, and the temperature of the hot air jet issuing from the slot-like nozzle is continuously adjustable. As different containers with different closure caps are to be processed with the same equipment, these features make it possible to take account of the different plasticisation properties or plasticisation speeds of the guarantee strips. With this arrangement, the optimum feed speed of the equipment can be established and adjusted empirically, with a small number of containers.

Apparatus for carrying out the process in a particularly simple manner comprises transport means for transporting the containers in a row and simultaneously rotating the containers about their own axes, along a predetermined feed path, and at least one assembly for producing a flow of hot gas, in particular hot air, provided along the feed path, the assembly having a slot-like nozzle disposed approximately at the level of the plane of movement of the guarantee strips with its outlet opening directed towards the guarantee strips which are moved therepast continuously in a row. The apparatus is guaranteed a high degree of operating reliability when the transport means comprises a transport channel whose side walls comprise on one side a drivable transport screw and on the other side, a wall arranged parallel to the axis of the transport screw and against which the containers roll, and when the bottom of the transport channel is formed by a drivable conveyor belt.

The transport screw forms, within the transport means, a particularly reliable means for moving the containers forwardly. There is virtually no possibility of the containers becoming jammed or rubbing against each other. The wall against which the containers roll also makes it possible to produce the rotary movement of the containers about their own axis, with the same drive means as that which produces the feed movement, namely the transport screw.

The containers pass through the transport means in a particularly trouble-free manner if the wall against which the containers roll is pre-stressed by a spring device clamping the containers between the transport screw and the wall. This arrangement ensures that the same pressing force is always applied between the wall and the containers. In addition, the spring device forms an additional operator safety device insofar as, if any one should unintentionally put his fingers in the region of the transport screw, the containers can be pushed aside, which enables the person to remove his hand without suffering serious injury.

In order to ensure that the feed force is applied to the containers by the transport screw at the optimum angle, the transport screw has a screw pitch of which the flank angles substantially correspond to the outside diameter of the bottle.

So that the bottle is reliably rotated about its own axis in the transport means and is not simply moved forwardly, without rotating, by the transport screw, the wall against which the bottles roll is provided on its side towards the bottles, with a facing of which the coefficient of friction is greater than that at the side flanks of the transport screw. If the pressure of the wall against the bottles is correctly selected, the bottles necessarily rotate about their own axes.

The shrink fitting process may be carried out in a particularly satisfactory manner if, in accordance with a further feature of the invention, a deflection plate is provided for deflecting the hot gas jet produced by the slot-like nozzle back on to the region of the guarantee strips remote from the nozzle. This deflection plate avoids heat losses, which thus permits more economical use of the hot air. So that the hot air which flows past the guarantee strip is deflected back on to the guarantee strip, the deflection plate has an arcuately curved end portion. This arcuately curved end portion of the deflection plate causes the hot air jet which issues from the nozzle in a horizontal direction to be deflected back on to the container so that the jet again impinges on the guarantee strip at an inclined angle from below, at the side of the container remote from the nozzle. The man skilled in the art finds no difficulty in selecting the curvature of the deflection plate in such a way as to produce an optimum swirl motion. Besides the saving of energy already mentioned, this arrangement provides the additional advantage that the guarantee strip, which at that time has not yet been completely shrink fitted on to the bottle, is also partly heated from the inside by the swirl current of hot gas from the deflection plate. It will be appreciated that this can even further reduce the plasticisation times required.

The deflection plate is preferably connected to the top of the slot-like nozzle and extends over the feed path in such a way that the row of closure caps is covered with a tunnel-like configuration, with the deflection portion at the side remote from the nozzle extending substantially parallel thereto. This tunnel-like configuration of the deflection plate results in an accumulation of heat over the entire length of the feed section, and this accumulation of heat has a particularly advantageous effect on palsticisation time. In addition, the deflection plate protects operating personnel, who are in front of the equipment, from the hot jet of gas.

DESCRIPTION OF A PREFERRED EMBODIMENT

Figure 1:
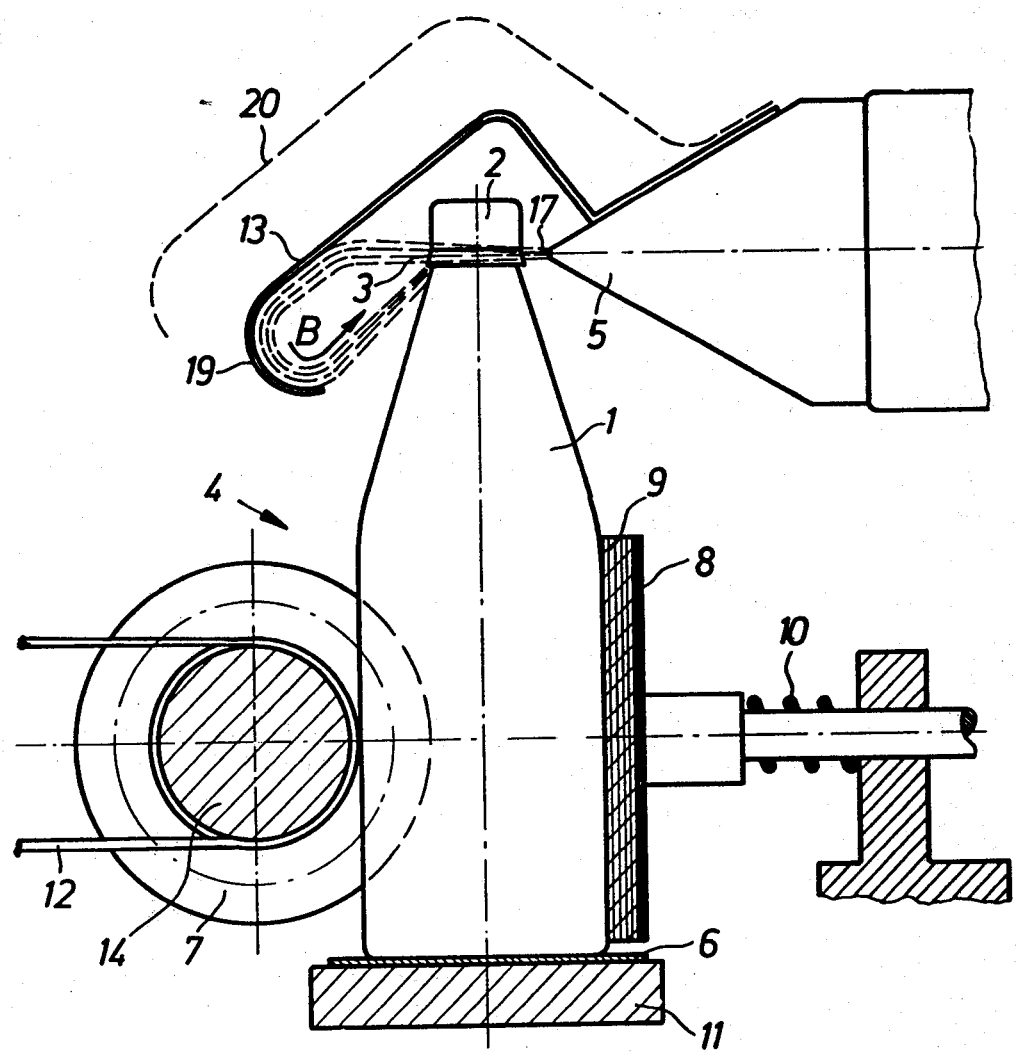
FIG. 1 is a view in cross-section through a transport means according to the invention.
Figure 2:
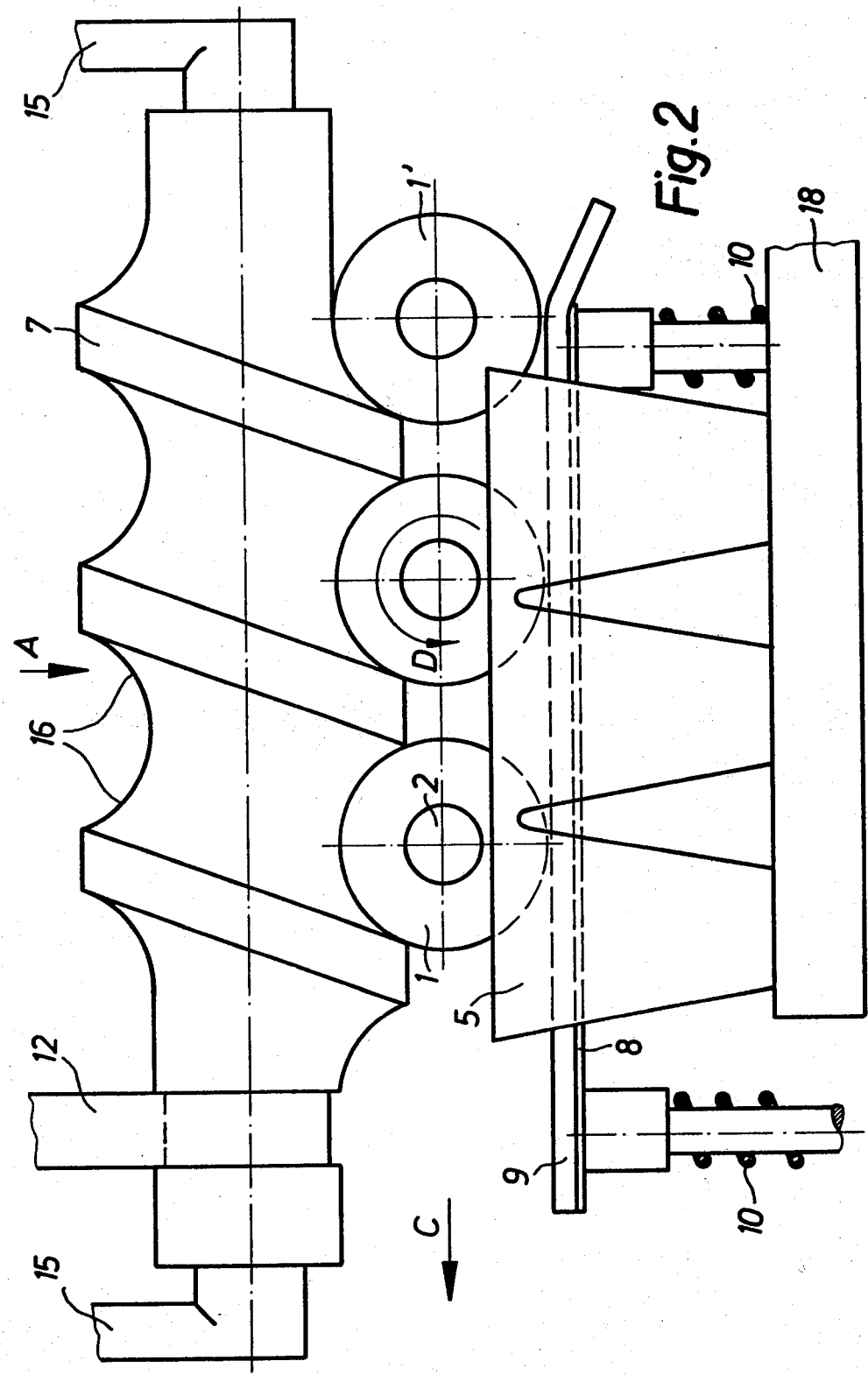
FIG. 2 is a simplified plan view of the transport means, without the deflection plate.

Referring to FIG. 1, a transport means 4 illustrated in simplified form, comprises a transport screw 7, a wall 8 against which the containers roll, and a conveyor belt 6. The shaft 14 of the screw 7 is driven, for example by a flat belt 12, thereby providing an additional safety factor in that if the screw shaft 14 is stopped, for example by an article of clothing which by mistake has passed into the apparatus, the flat belt 12 stops and the screw shaft comes to a halt. It will be understood however that any other kind of transmission may be used for driving the screw shaft 14, for example a gear transmission or a toothed belt.

The screw shaft 14 is mounted at both ends in shaft mountings 15. The shaft mountings are preferably so constructed that the transport screws can be replaced quickly, and at low cost.

During movement in the transport means 4, the bottles 1 stand on the conveyor belt 6 moving for example over a conveyor table 11. The conveyor belt 6 brings the bottles 1 to the transport means and conveys them away after guarantee strips 3 have been shrink fitted on to the bottles. It will be understood that a multiplicity of conveyor rollers disposed close together may be used, instead of the conveyor belt. The wall 8 against which the bottles roll is pressed against the bottles 1 by a spring device 10. The wall 8 is provided with a facing 9 of which the coefficient of friction with the bottles is greater than that at the sides 16 of the screw pitch of the transport screw 7. It has been found particularly advantageous for the facing 9 to be made from a suitable plastics material. The material for the facing 9 must be selected to ensure a high coefficient of friction, both when operating with glass bottles and when operating with plastic bottles.

A slot-like nozzle 5 is arranged approximately in the plane of movement of the guarantee strips 3 and is directed substantially at right angles towards the axis of the bottles. A hot air device 18 supplies hot air to the slot-like nozzle 5 and produces a gas jet 17 which impinges on the guarantee strip over the entire feed distance covered by the bottles 1 in the transport means 4. The guarantee strips are shrink fitted on to the bottles 1 on the one hand by virtue of the hot air jet 17 which is under a pressure and on the other hand by the adhesion forces of the bottle, which forces act on the inside of the guarantee strip. In some cases, closure caps 2 may be used in the production of which the guarantee strip 3 is prestressed to cause the guarantee strip to bear against the mouth of the container immediately the guarantee strip is made plastic.

Figure 3:
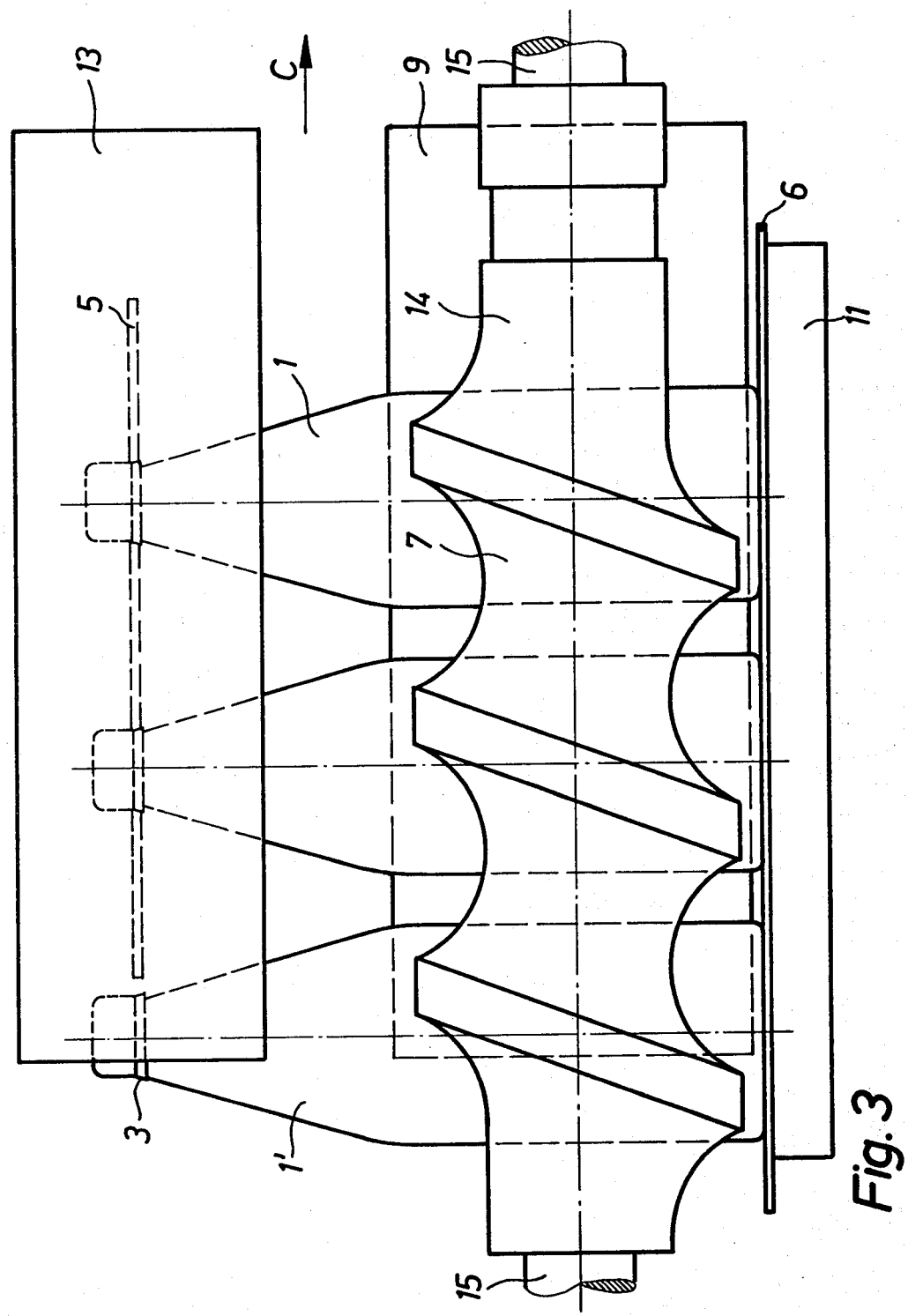
FIG. 3 is a view of the transport means from the direction A in FIG. 2, but with the deflection plate.

To avoid excessive heat loss in the transport means 4 when shrink fitting the guarantee strips, and to give the gas jet 17 a double action, a deflection plate 13 is secured to the nozzle 5. The deflection plate 13 has an arcuately curved end portion 19. As can be seen in particular from FIG. 1, the deflection plate 13 with its arcuately curved end portion 19 causes deflection of the jet hot gas at 17. If the configuration of the end portion is correctly selected, the gas jet 17 is deflected obliquely upwardly on to the guarantee strip 3, in the direction indicated by arrow B. With this arrangement, optimum use is made of the effect of the hot gas jet 17, which has a particularly positive effect on the manufacturing costs for each guarantee closure. An additional advantage of the deflection plate 13 is that the operator, who may be standing in front of the transport means, is protected from the effect of the gas jet 17. This protective action can be further increased by an apertured plate 20 which curves over the entire length of the deflection plate 13. The deflection plate 13 is heated to an extreme degree during operation of the apparatus, and the apertured plate 20 prevents anyone from coming into direct contact with the deflection plate 13 and thereby suffering from burns. As can be seen from FIG. 3, the deflection plate 13 forms a kind of tunnel which extends over the entire length of the feed section of the transport means 4.

It will be understood that within the scope of the present invention, the guarantee strip 3 could be subjected to the impingement of jets of gas from two slot-like nozzles simultaneously from two sides. Means other than the hot gas jet 17 issuing from the slot-like nozzle could also be used in certain cases for plasticising the guarantee strips 3. Thus for example it would be possible for the guarantee strips 3 to pass through an electromagnetic field in their plane of movement in the transport means, the electromagnetic field causing the shrink fitting action. It would also be possible for example to use ultrasonic means.

In operation of the apparatus, the bottles 1 are introduced into the transport means 4 in the direction indicated by arrow C. The mouths of the bottles 1 have already been closed with closure caps 2, by means of a cap fitting device disposed upstream of the transport means 4. The screw 7 drives the bottles 1 forwardly in the transport means in the direction indicated by arrow C, the bottles being simultaneously pressed against the sides 16 of the screw pitch of the screw 7 by the wall 8 against which the containers roll. As the coefficient of friction of the facing 9 of the wall 8 is greater than the coefficient of friction at the sides 16 of the screw 7, the bottle 1 is necessarily rotated about its own axis, in the direction indicated by arrow D. During the entire feed movement of the bottle 1 in the transport means 4, a jet of hot gas 17 from the slot-like nozzle 5 impinges on the guarantee strip 3 and causes it to be shrunk on to the neck of the bottle. In order to cause uniform shrinkage over the entire periphery of the gurantee strip 3, the bottle 1 is rotated about its own axis in the transport means at least once or preferably several times. It will be seen that the predetermined feed path in the transport means 4 must correspond to the distance defined by the number of revolutions of the bottle 1 multiplied by the periphery of the bottle. The lengths of the screw 7, the wall 8 and the slot-like nozzle are each adapted to the respective desired number of revolutions to be performed by the bottles in the transport means 4. The length of the feed distance is therefore directly dependent on the number of revolutions of the bottle and the periphery of the bottle. In contrast, the feed speed of the screw 7 and the plasticisation temperature of the hot gas jet 17 may be varied as desired and adapted to the operating requirements of the equipment. The hot gas jet 17 is deflected back on to the underside of the guarantee strip 3 by the deflection plate 13, providing a continuous heating action on the guarantee strip 3 in the transport means 4, not only by virtue of the gas jet from the slot-like nozzle 5 but also from the side of the bottle 1, which is remote from the slot-like nozzle 5.

It will be seen that an individual guarantee strip is plasticised and shrink fitted on to its bottle continuously during the entire feed movement from the beginning up to the end of the feed section. As however the transport means can receive a fresh bottle 1' before the guarantee strip 3 of a preceding bottle 1 has been fully shrink fitted, the process according to the invention ensures a particularly rational mode of operation.

If the feed speed of the bottles 1 in the transport means 4 is to be increased, it is only necessary for the screw shaft 14 to be driven at a higher speed. At the same time, the plasticisation temperature of the hot gas jet 17 must be increased, as, with a higher feed speed, the guarantee strips 3 are exposed to the hot gas jet 17 for a correspondingly shorter period.

The apparatus according to the invention does not encounter any difficulties in shrink fitting closure caps 2 on bottles 1 of different configurations and diameters. As the sides 16 of the pitch of the screw 7 are adapted to the respective diameter of the bottles 1, it is only necessary to change the screw 7, in order to operate the apparatus on bottles of different diameters. The slot-like nozzle 5 is vertically adjustable, so that the nozzle 5 can always be set precisely to the plane of movement of the guarantee strips. In this way, only a small number of manual operations are required to adapt the apparatus to a new bottle shape.

The man skilled in the art will not find any difficulty in correctly selecting the characteristics of the screw 7, so that this will not be described in detail herein. However, the side surfaces 16 of the screw are advantageously arranged at such an angle that the feed force at the side surfaces 16, which acts on the bottles 1, acts at the most favourable possible angle, towards the axis of the containers.

It will be understood that without departure from the scope of the invention, a different conveyor means may be used instead of the screw 7, for moving the bottles 1 forwardly and rotating them about their own axes. For example the bottles 1 may be gripped in the transport means 4 between two conveyor belts which are mounted in a vertical direction and which move in opposite directions, one of the conveyor belts being driven at a higher speed in order to produce the forward movement of the bottles. It would also be possible for the screw 7 to be replaced by a toothed belt in which the sides of the teeth each engage a respective bottle and move the bottle through the transport means.

I claim:

1. Apparatus for the simultaneous and continuous production of a guarantee closure on a multiplicity of containers with closure caps each having a guarantee strip of plastics material separable along a desired tear line, said strip being positively shrink fitted on to the neck of the associated container by heating, comprising transport means for transporting the containers in a row along a predetermined feed path and for simultaneously rotating the containers about their own axes, at least one assembly for producing a flow of hot gas, provided along the feed path, a slot-like nozzle of said assembly disposed approximately at the level of the plane of movement of the guarantee strips, the outlet opening of said nozzle being directed toward the guarantee strips on said containers as they are moved therepast continuously in a row, while rotating about their own axes to thereby direct the hot gas against the guarantee strips, and a deflector for receiving hot gas from said nozzle after the hot gas has passed the guarantee strips and redirecting it back onto the region of the guarantee strips on the side opposite the nozzle.

2. Apparatus as defined in claim 1, wherein said transport means comprises a transport channel defined by side walls comprising a drivable transport screw on one side and a wall arranged parallel to the axis of the transport screw on the other side the bottom of said channel being formed by a drivable conveyor belt.

3. Apparatus as defined in claim 2, wherein said wall is prestressed by a spring device to clamp the containers between the transport screw and the wall.

4. Apparatus as defined in claim 1, wherein said deflector has an arcuately curved end portion located such that the guarantee strips on the containers move between said nozzle and said arcuately curved end portion.

5. Apparatus as defined in claim 4, wherein said deflector comprises a deflection plate which is connected to the top of the slot-like nozzle and extends over the feed path to cover the row of closure caps in a tunnel-like configuration, the deflection portion at the side remote from the nozzle extending substantially parallel to the nozzle.

6. Apparatus as claimed in claim 1 wherein said deflector includes a deflector surface located on the opposite side of the row of containers from said nozzle.

* * * * *